Figure 1:
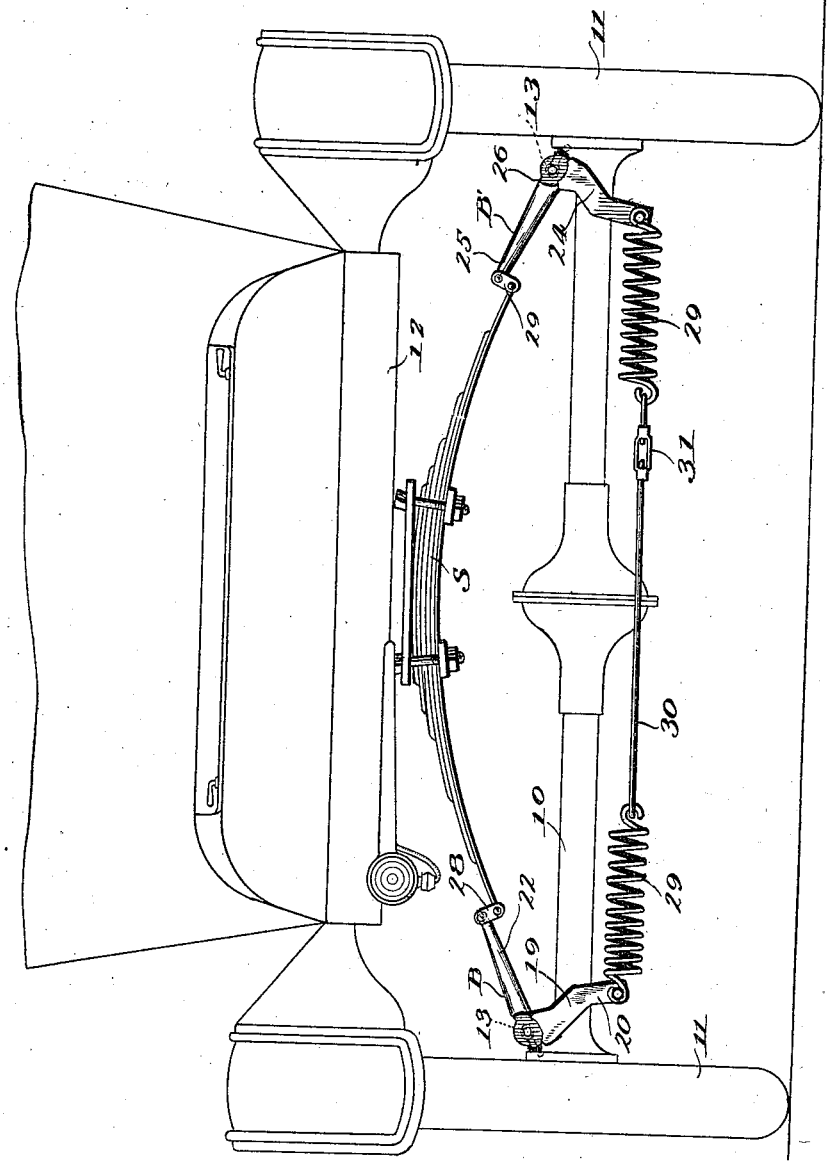

May 1, 1923.

J. O. DELGADO 1,453,785

SHOCK ABSORBER FOR MOTOR VEHICLES

Filed April 4, 1922   2 Sheets-Sheet 1

WITNESSES

INVENTOR
Juan O. Delgado
BY
ATTORNEYS

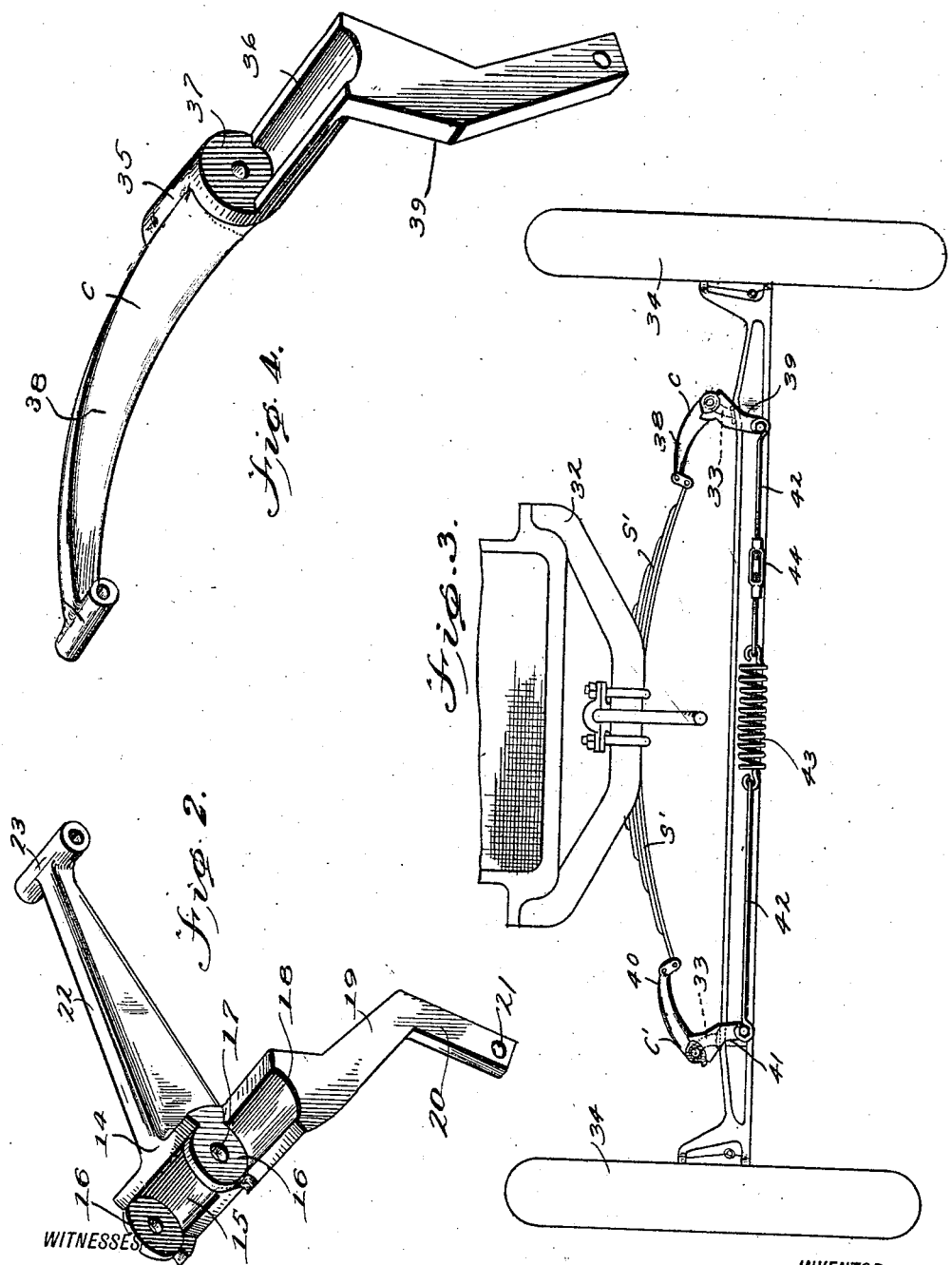

Patented May 1, 1923.

1,453,785

UNITED STATES PATENT OFFICE.

JUAN OLIVEROS DELGADO, OF EL PASO, TEXAS.

SHOCK ABSORBER FOR MOTOR VEHICLES.

Application filed April 4, 1922. Serial No. 549,552.

*To all whom it may concern:*

Be it known that I, JUAN OLIVEROS DELGADO, a citizen of the Republica de Mexico, and a resident of El Paso, in the county of El Paso and State of Texas, have invented certain new and useful Improvements in Shock Absorbers for Motor Vehicles, of which the following is a specification.

This invention relates to a shock absorber for motor vehicles.

The object of the invention is to associate supplemental spring means with the ordinary leaf springs of a motor vehicle or the like, in such a manner that the supplemental springs will operate in unison with the leaf springs in absorbing shocks to which the same may be subjected.

It is also an important object of the invention that the supplemental springs be arranged to continuously take the load imposed upon the leaf springs and thus afford a yieldable sustaining means for the leaf springs with the result of lessening the possibility of over burdening the same.

Other objects relating to details of construction will hereinafter appear.

In carrying out the invention it is contemplated to use a semi-elliptical leaf spring of the ordinary construction and to arrange it beneath the vehicle body or chassis frame transversely thereof, and to connect each end thereof with the associated axle through a bell crank lever and to provide supplemental spring means to resist the movement of the bell crank levers.

The present invention is particularly adapted for use in connection with the so called "Ford" type of motor vehicle and so shown by way of example in the accompanying drawings, in which:—

Figure 1 is a rear end elevation of a motor vehicle of the type referred to and showing the application of the present invention, Figure 2 is an enlarged perspective view of one of the bell crank levers used in connection with the rear spring suspension shown in Figure 1, Figure 3 is a partial front elevation of a motor vehicle similar to the one shown in Figure 1 and showing the application of the invention to the front spring thereof, Figure 4 is an enlarged perspective view of one of the bell crank levers associated with the front spring suspension shown in Figure 3.

Referring to the drawings in detail and particularly to Figures 1 and 2, 10 indicates a rear axle housing or casing, 11 the rear supporting wheels and 12 the chassis frame. In this instance a pair of bell crank levers B and B' are fulcrumed to the spring perches 13 carried by the rear axle construction 10. These spring perches are of well known construction, and as is also known are provided for connecting the rear spring of this type of car with the rear axle.

The bell crank lever B is specifically shown in Figure 2 and consists in a hub portion 14 which is formed with a bearing portion 15 and the two circular plate members 16. The plate members 16 are so spaced that they are adapted to receive a perch 13. Each circular plate portion 16 is provided with a central opening 17 and through which a pin or bolt may be extended, said bolt passing through the perch 13 and thus pivotally connecting the bell crank lever B with the perch. The hub portion 14 of the bell crank lever B has also formed therewith an extension 18 terminating in the arm 19 disposed downwardly and at right angles thereto, and said arm 19 having formed therewith an annular projection 20 which is provided at its free end with an opening 21. The purpose of offsetting the arm 19 with relation to the hub 14 is so that it may move upward and downward with respect to the axle housing 10 without interference therewith. The other arm 22 of the bell crank lever B is preferably of the shape shown and its outer end terminating in a bearing sleeve 23 disposed at right angles to the arm.

The bell crank lever B' is of substantially the same construction as the bell crank lever B with the exception that its arms 24 and 25 extend from a different point of the hub portion 26. Also a pin or bolt is used for pivoting the hub portion 26 to the associated perch 13 in the manner described for the bell crank lever B.

Beneath the chassis frame 12 at the rear end thereof there is secured in a preferred manner the semi-elliptical spring generally indicated by the reference character S. The one end of the semi-elliptical spring is pivotally connected to the arm 22 of the bell crank lever B by the means of links or shackles as at 28, and the other end is similarly connected as at 29 to the arm 25 of the bell crank lever B'.

The arms 19 and 24 of the bell crank levers B and B' respectively are connected by the means of the coil springs 29 and the rod 30. The coil springs 29 may be referred to as supplemental springs, and interposed in the rod 30 is a turnbuckle 31 for the purpose of adjusting the tension of the coil springs 29.

Referring to Figures 3 and 4, 32 indicates a cross member which usually extends beneath the radiator of the type of automobile herein shown, and S' indicates the front spring. The perches 33 by which the front spring S' is usually supported, in this instance, fulcrum the bell crank levers C and C'. The perches 33 extend toward the supporting wheels 34 and for this reason the specific construction of the bell crank levers C and C' must slightly differ to the construction of the bell crank levers B and B' used on the rear axle of the motor vehicle. The bell crank lever C is specifically shown in Figure 4 and as is seen its hub portion 35 has its bearing portion 36 for the perch 33 formed on its opposite side when compared with the bell crank lever shown in Figure 2. Also suitable plates 37 are formed with the hub 35 and provided with suitable openings as shown through which a pin or the like may be extended for pivotally connecting with associated perch 33. The arms 38 and 39 of the bell crank lever C extend in such a direction that they oppose the arms 40 and 41 respectively of the bell crank lever C'. The arms 39 and 41 are connected by the pair of rods 42 and the coil spring 43. The coil spring 43 in this instance is the supplemental spring before referred to and in the rod 42 there is interposed a turnbuckle 44 for the purpose of adjusting the tension of the spring 43.

The operation of both front and rear spring suspension heretofore described is the same. In describing this operation the rear spring construction will be specifically referred to and which will also suffice for the front spring construction.

As is seen when the load imposed upon the spring S is transmitted directly to the coil springs 29. These coil springs 29 may be adjusted by the means of the turnbuckle 31 to raise the spring S to the desired point. By this arrangement it is seen that the shock imposed upon S will be absorbed in unison by the coil springs 29 or so called supplemental springs and the spring S. Also as is obvious as the spring S is subjected to a quick shock the yieldable connection between the arm 19 and 24 of the bell crank levers B and B' respectively lessens the possibility of the spring S snapping under such a shock.

Furthermore by this construction the rebound of the spring S will be gradual. Also it may be mentioned that by this particular spring suspension the possibility of the automobile or motor vehicle being overturned when turning a curve rapidly is greatly reduced.

It may be further mentioned that it is advisable that the springs S and S' be of the same size and construction in order that uniformity may be had. In this instance where the Ford car is used it is well to discard the conventional rear spring of the car and substitute therefor a spring of the same construction as the conventional front spring. It has been found by experience that this is the best arrangement.

While I have shown and described the preferred form of my invention, I wish it to be understood that I am aware of the fact that the construction, combination and arrangement of parts may be changed by those skilled in the art without departing from the spirit of the invention as indicated by the appended claims.

I claim:—

1. In an apparatus of the character described, in combination, an axle, a bell crank lever comprising a casting including a hub portion terminating at each end in a radially extending arm, said arms being disposed at an angle to each other, and said hub portion being substantially semi-circular in shape adjacent its one end, a perch secured to the axle and extending upwardly therefrom, said perch having a head adapted to fit within the semi-circular portion of the bell crank hub, and means for pivotally connecting the perch to said hub portion of the bell crank lever.

2. In an apparatus of the character described in combination, an axle, a bell crank lever comprising a casting including a hub portion terminating at each end in a radially extending arm, said arms being disposed at an angle to each other, and said hub portion being substantially semi-circular in shape adjacent its one end, a perch secured to the axle and extending upwardly therefrom, said perch having a head adapted to fit within the semi-circular portion of the bell crank hub, and a transverse plate formation at each end of the semi-circular portion of the bell crank hub adapted to receive therebetween the head of said perch, and a pin extending through said perch and said openings in said plate formations whereby to pivotally connect the perch to said bell crank hub.

JUAN OLIVEROS DELGADO.